United States Patent [19]

Hiraike

[11] 4,364,651
[45] Dec. 21, 1982

[54] EXPOSURE ASCERTAINING DEVICE FOR CAMERAS

[75] Inventor: Fumiaki Hiraike, Hachioji, Japan

[73] Assignee: Konishiroku Photo Industry Co., Ltd., Japan

[21] Appl. No.: 251,750

[22] Filed: Apr. 7, 1981

[30] Foreign Application Priority Data

Apr. 15, 1980 [JP] Japan .................................. 55/48730
Apr. 15, 1980 [JP] Japan .................................. 55/48731

[51] Int. Cl.³ .............................................. G03B 7/00
[52] U.S. Cl. ........................................ 354/31; 354/56
[58] Field of Search ................... 354/23 R, 31, 56, 59

[56] References Cited

U.S. PATENT DOCUMENTS 3,730,063  5/1975  Kobayashi et al. ................... 354/31
3,864,699  2/1975  Tsunekawa et al. ............. 354/56 X
4,172,643 10/1979  Schulz et al. ..................... 354/59 X

*Primary Examiner*—Michael L. Gellner
*Attorney, Agent, or Firm*—Jordan B. Bierman; Linda Bierman

[57] ABSTRACT

An exposure ascertaining device for cameras, in which the exposure of the film is ascertained on the basis of variations in an output from a photoelectric element disposed in a position where said photoelectric element can receive the incident light passed through a film. An exposure ascertaining device for cameras, comprising a photoelectric element disposed in a position which is away an optical path in which such a part of the incident light that enters the surface of a film and which position permits said photoelectric element to receive such a part of the incident light that advances toward a film-surrounding region of a film-set side of the camera. Another photoelectric element disposed in a position which permits the same photoelectric element to receive the light reflected from the film-surrounding region of the film-set side of the camera. The movements of movable members which are adapted to be moved when the film is exposed are ascertained on the basis of outputs from said photoelectric elements.

2 Claims, 5 Drawing Figures

EXPOSURE ASCERTAINING DEVICE FOR CAMERAS

BACKGROUND OF THE INVENTION

1. Field of the Invention

This invention relates to an exposure ascertaining device for cameras.

2. Description of the Prior Art

A conventional camera is not provided with a means for making sure that a film has been exposed without trouble in a photographing operation.

Conventional cameras include a camera in which sequential photographing actions are made by mechanical interlocking actions. In a case where even one movable member of such type of camera among a plurality of movable members thereof, which are moved when a film is exposed, has got out of order to be stopped, other movable members operatively connected to the first-mentioned movable member also come to a stop. This causes a shutter to become inoperable at last. In many cases, an accident to such a camera comes under the user's notice only when a shutter trouble as mentioned above occurs. In addition, it would occur that a shutter trouble, in which a shutter is stopped in an opened state, is left unnoticed to result in a loss of an opportunity of taking photographs and wasteful consumption of a film.

Conventional cameras also include a camera in which sequential photographing actions are made by an electric control circuit. In such type of camera, operational instructions are given to each movable member thereof by the control circuit in accordance with sequential photographing actions to thereby move the members. Therefore, even in a case where one of these members gets out of order to be stopped when a film is exposed, the other members are moved normally. Such a trouble would not come under the user's notice until the film has been developed.

SUMMARY OF THE INVENTION

An object of the present invention is to provide an exposure ascertaining device which permits preventing the above-mentioned troubles, which cause a loss of an opportunity of taking photographs and wasteful consumption of a film, from being left unnoticed.

Another object of the present invention is to provide an exposure ascertaining device comprising a photoelectric element disposed at the rear side of a film through which incident light permeates, the exposure of the film being ascertained on the basis of variations in an output from the photoelectric element; or a photoelectric element disposed in a position which is away from an optical path in which such a part of incident light that enters the surface of the film and which permits the photoelectric element to receive such a part of the incident light that advances toward a film-surrounding region of the film-set side of the camera, and another photoelectric element disposed in a position which permits the same photoelectric element to receive the reflected light from the film-surrounding region of the film-set side of the camera, the movements of members, which are adapted to be moved when the film is exposed, being ascertained on the basis of outputs from these photoelectric elements.

The above and other objects as well as advantageous features of the invention will become apparent from the following description of the preferred embodiments taken in conjunction with the accompanying drawings.

DESCRIPTION OF THE PREFERRED EMBODIMENTS

Figure 1:
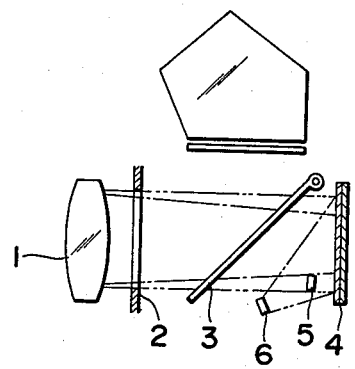
FIG. 1 is a diagrammatic side elevational view of the principal elements of a camera, illustrating an example of an arrangement of photoelectric elements.

Referring to FIG. 1, reference numeral 1 denotes a photographing lens, 2 a diaphragm, 3 a movable finder mirror, and 4 a shutter curtain unit for a focal-plane shutter, consisting of a front curtain and a trailing curtain. The light passing through the photographing lens 1 is condensed by the diaphragm 2. When the movable finder mirror 3 is rotated upwardly, the incident light enters a film-set side of the camera along an optical path shown as a two-dot chain line in the drawing but all of the light advancing in the mentioned optical path does not enter the surface of a film. That part of the incident light which advances inside a limited range, which is shown in one-dot chain line in the drawing, of the optical path mentioned above enters the surface of the film.

Therefore, according to the present invention, photoelectric elements 5, 6 are provided in a position outside the optical path in which such a part of incident light that enters the surface of the film, i.e. a position in which the light advancing therearound has no influence upon the exposure of the film, and in which such a part of the incident light that passes through the photographing lens 1 to enter the film-set side of the camera can be received; and a position in which the incident light reflected from a film-surrounding region, respectively. Thus, information on movements of movable members, i.e. the diaphragm 2 and movable finder mirror 3, which have relation to variations in the light entering the film-surrounding region, is obtained from the photoelectric element 5, while information on movements of the shutter curtain unit 4 is obtained from the photoelectric element 6. When sequential photographing actions are made normally, outputs from these photoelectric elements 5, 6, which are based on the light received thereby, are varied as shown in FIG. 2.

Figure 2:
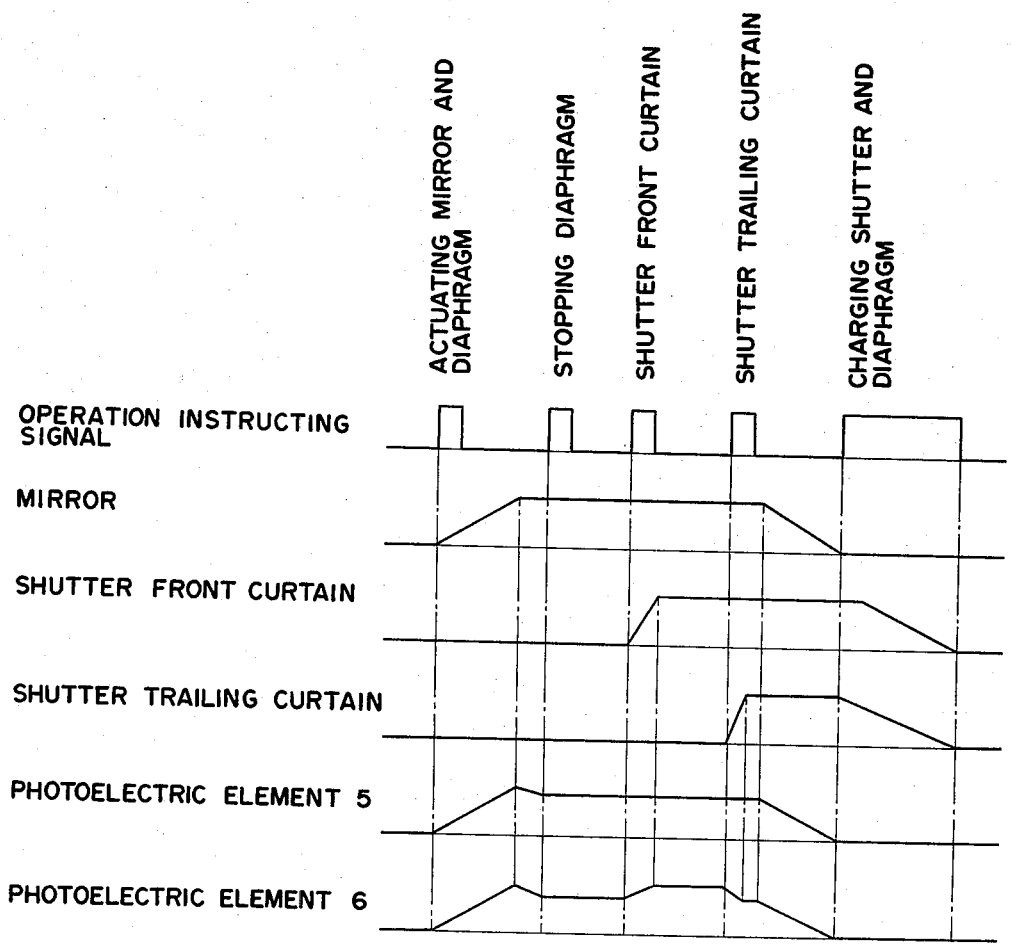
FIG. 2 is a timing chart of operations of main elements.

FIG. 2 shows an example of variations in outputs from the photoelectric elements 5, 6 in a camera in which sequent photographing actions are carried out in accordance with an operation instructing signal outputted from a control circuit. What is shown in this drawing is also applicable to a camera in which sequential photographing actions are carried out by a mechanical interlocking operation. Variations in an output from the photoelectric element 5 have relation to the movements of the diaphragm and movable finder mirror, while variations in an output from the photoelectric element 6 have relation to the movements of these parts as well as of the movements of the front and trailing curtains of the shutter curtain unit. Accordingly, information on the movements of not only the shutter curtain unit but also the movable finder mirror and diaphragm can be obtained from the photoelectric element 6 alone. However, in order to obtain more accurate information, the photoelectric element 5 is also utilized.

Figure 3:
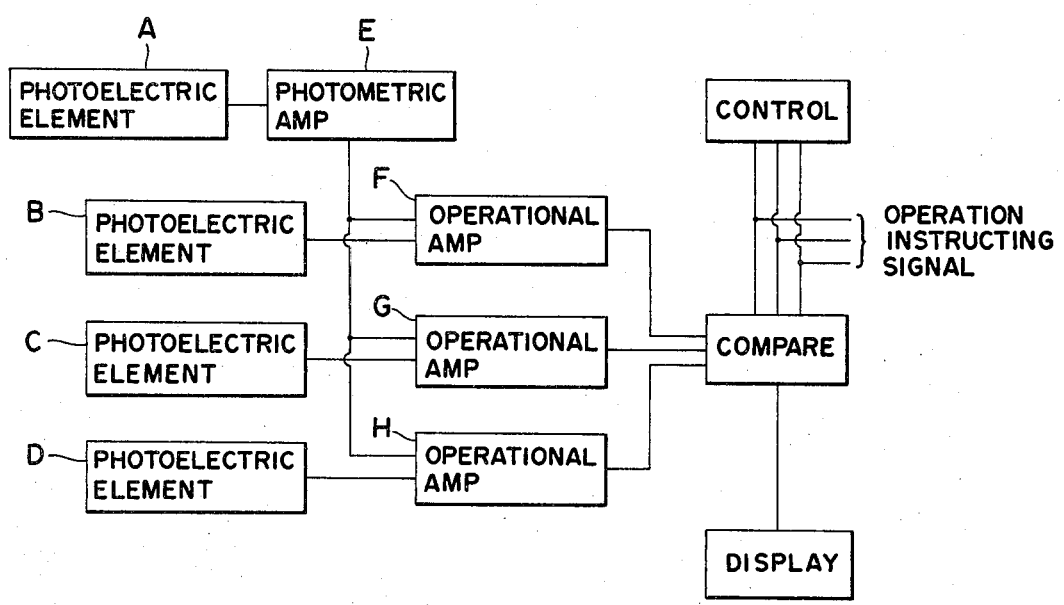
FIG. 3 is a block diagram of a detection-display circuit.

In order to make sure on the basis of information outputted from the photoelectric elements 5, 6 that the movable members, such as the movable finder mirror and shutter curtain unit have been moved normally, a circuit as shown in FIG. 3 is used.

Referring to FIG. 3, a symbol A denotes an exposure condition setting photoelectric element, B, C photoelectric elements identical with the photoelectric elements 5, 6 shown in FIG. 2, and D a photoelectric element provided as necessary in addition to the photoelectric elements B, C and used to detect the movements of movable members. The photoelectric element D consists of, for example, a photoelectric element used to detect the movements of the diaphragm at a high reliability. This photoelectric element is provided in a position where such light can be received that varies, while the lens is stopped down with the degree of opening of the diaphragm in excess of a maximum level changed to a lower level via the maximum level, from an instance at which the diaphragm is opened in excess of a maximum degree of opening to an instance at which the diaphragm is opened at the maximum degree of opening. An output from the photoelectric element A is amplified in a photometric amplifier E and inputted into an operational amplifier circuits, F, G, H. The operational amplifier circuits F, G, H are adapted to extract on the basis of an output from the photoelectric element A information on the movements of the movable members from the photoelectric elements B, C, D and amplify the information. The resulting information from the operational amplifier circuits F, G, H is inputted into a comparator circuit. In the comparator circuit, the information inputted thereinto is compared with a signal from the control circuit which is adapted to output an operation instructing signal. When a release has been operated, a signal representative of the results of movements of the movable members is outputted into a display. The display is designed in such a manner that, when the signal received thereby indicates that, for example, one of the movable members failed to be moved, the display is operated so as to turn on or off a display lamp, change a display plate, turn on a buzzer, inhibit the movement of a movable member which is to be moved after the movable member in question, or inhibit the advancing of the film for the following photographing operation. The results of movements of the movable members are thus informed to the photographer. The display referred to above includes a display means having the above-described function and a drive means for actuating the display means.

The photographer can be informed of the occurrence of an accident to his camera immediately owing to the above-described system. Accordingly, the repeating of useless photographing operations, the losing of an opportunity of taking pictures and the wasting of films/- can be prevented.

The exposure ascertaining device according to the present invention can be applied to not only a camera employing a focal-plane shutter but also a camera employing a lens shutter. When this exposure ascertaining device is applied to a single-lens reflex camera using a shutter curtain of a focal-plane shutter or a lens shutter, a layer of coating or a thin film may be provided on a front surface of a movable light-shielding plate with which the surface of a film is covered, in order that the front surface of the light-shielding plate has reflection power different from that of the surface of the film. This allows a level of a detection output representative of the movements of the shutter curtain or shutter to be increased, so that it becomes unnecessary to refer to an output from, for example, a photoelectric element A in the detection-display circuit shown in FIG. 3. The photoelectric element for use in detecting the movements of the movable members may also be used as an exposure condition setting element.

The detection-display circuit used in the present invention may be adapted to display separately the movements of a plurality of movable members. It may also be adapted to display not only the movements of the movable members but also the abnormality of the velocity of movements of the movable members by comparing the time of duration of an output from a photoelectric element with, for example, the output timing of an operation instructing signal from the control circuit. Furthermore, in the present invention, the photoelectric element for use in detecting the movements of the movable members may also be used as a photoelectric element for use in setting the exposure condition.

Figure 4:
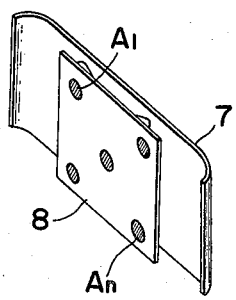
FIG. 4 is a perspective view illustrating another example of an arrangement of photoelectric elements.

FIG. 4 shows another embodiment of the present invention. Referring to FIG. 4, reference numeral 7 denotes a rear cover for a camera, and 8 a pressure plate elastically attached to the cover 7. Photoelectric elements $A_1-A_n$ are embedded in the pressure plate 8 in such a manner that light-receiving surfaces of the elements $A_1-A_n$ face a film. Needless to say, the photoelectric elements $A_1-A_n$ may be so provided on the cover 7 that they receive the incident light passed through the film and through bores provided in the pressure plate 8. The photoelectric elements $A_1-A_n$ may not be provided plurally, and the light to be detected thereby is not limited to visible light.

Figure 5:
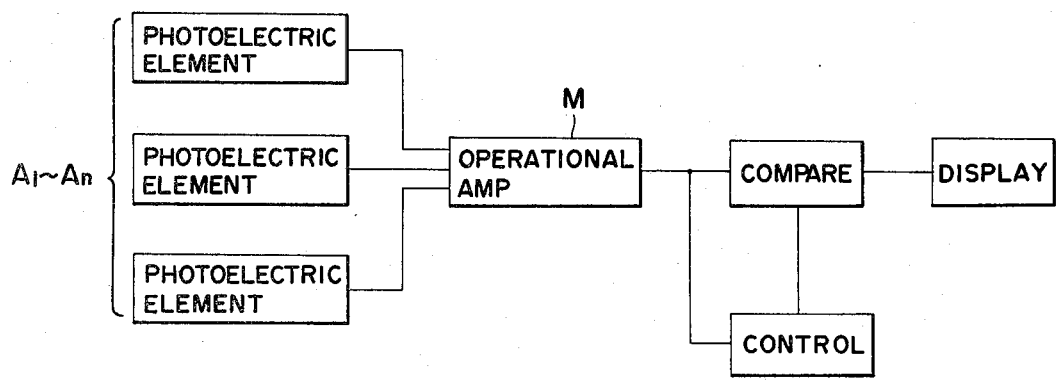
FIG. 5 is a block diagram of a detection-display circuit for the embodiment shown in FIG. 4.

Referring to FIG. 5, outputs from the photoelectric elements $A_1-A_n$ as mentioned above are added and amplified in an operational amplifier circuit M and then, inputted into a control circuit and a comparator circuit. The control circuit is adapted to memorize a signal outputted from the operational amplifier circuit M before a shutter release operation is carried out, and an output from a photometric unit (not shown) for use setting exposure conditions, and to output the information thus memorized therein into the comparator circuit. The comparator circuit is adapted to compare an input from the control circuit with an input from the operational amplifier circuit B, and ascertain that an output from the operational amplifier circuit M, which is obtained after a shutter release operation is conducted in such a condition that an output from the photometric unit is higher than an output from the operational amplifier circuit M obtained before a shutter release operation is conducted, namely, in such a condition that the exposure of a film can be effected, has become different from an output from the operational amplifier circuit M, which had been obtained before a shutter release operation was conducted, or ascertain that the film has been exposed. For example, when the film is not exposed, a display unit is operated so as to turn on or off a display lamp, change a display plate, turn on a buzzer, or inhibit the advancing of the film for the following photographing operation. This allows the photographer to be informed immediately of the occurrence of trouble in his camera, so that the malfunctioning camera can be prevented from being subjected to repeated useless photographing operations.

The present invention is not limited to the above-described embodiments. The exposure ascertaining device according to the present invention may be so constructed that, for example, the difference between outputs from a photoelectric element, which are obtained before and after a shutter release operation is conducted, is detected with a comparator circuit not receiving an output from a photometric unit, to simply indicate that the film is exposed or not. (When, in such a structure, the incident light cannot be obtained, a trouble, if any, in the camera cannot be informed to the photographer.) The exposure ascertaining device having this structure also has an excellent effect.

While the described embodiments represent the preferred form of the present invention, it is to be understood that modifications will occur to those skilled in the art without departing from the spirit of the invention. The scope of the invention is therefore to be determined solely by the appended claims.

What is claimed is:

1. In a camera having a plurality of movable, sequentially operable parts controlling the exposure of a film, the combination of a first photoelectric element positioned outside of the normal optical path of incident light impinging upon the surface of a film but responsive to that part of the incident light advancing toward a film-surrounding region of the film-set side of the camera, a second photoelectric element positioned outside of the normal optical path of incident light impinging upon the surface of a film, but responsive to the light reflected from the film-surrounding region of the film-set side of the camera, whereby the outputs of said photoelectric elements are dependent upon the sequential operation of the movable camera parts during exposure of the film, means measuring the outputs of said photoelectric elements, and means responsive to said output measuring means for ascertaining the movement of said movable parts.

2. In a camera according to claim 1, in which said last means comprises a comparator, a source of control signals indicating the normal operation of the camera, means feeding said control signals and the outputs of said photoelectric elements to said comparator, and display means connected to the output of said comparator for producing a signal when the outputs of said photoelectric elements do not match the output of said control signals, whereby the operator of the camera is alerted to the malfunction of the movable camera parts.

* * * * *